United States Patent
Nikawa et al.

(10) Patent No.: US 6,853,286 B2
(45) Date of Patent: Feb. 8, 2005

(54) FLAT COIL COMPONENT, CHARACTERISTIC ADJUSTING METHOD OF FLAT COIL COMPONENT, ID TAG, AND CHARACTERISTIC ADJUSTING METHOD OF ID TAG

(75) Inventors: Yoshio Nikawa, Yokohama (JP); Taiga Matsushita, Tokyo (JP); Yasukazu Nakata, Matsudo (JP); Yuichi Iwakata, Warabi (JP)

(73) Assignee: Lintec Corporation (JP)

( * ) Notice: Subject to any disclaimer, the term of this patent is extended or adjusted under 35 U.S.C. 154(b) by 452 days.

(21) Appl. No.: 10/141,976

(22) Filed: May 10, 2002

(65) Prior Publication Data

US 2002/0183022 A1 Dec. 5, 2002

(30) Foreign Application Priority Data

May 31, 2001 (JP) ........................................ 2001-163849

(51) Int. Cl.[7] ................................................ H01F 5/00
(52) U.S. Cl. ........................ 336/200; 336/192; 336/232; 29/602.1
(58) Field of Search ................................ 336/200, 223, 336/232, 192; 29/602.1, 905

(56) References Cited

U.S. PATENT DOCUMENTS

| 4,042,952 A | 8/1977 | Kraybill | 357/68 |
|---|---|---|---|
| 6,255,725 B1 * | 7/2001 | Akagawa et al. | 257/679 |
| 6,722,017 B2 * | 4/2004 | Rittner et al. | 29/602.1 |
| 2004/0178876 A1 * | 9/2004 | Koizumi et al. | 336/200 |

FOREIGN PATENT DOCUMENTS

| EP | 0996082 A1 | * | 4/2000 | |
| JP | 55024490 A | * | 2/1980 | ........... H01F/17/04 |
| JP | 59105304 A | * | 6/1984 | ........... H01F/15/00 |
| JP | 8-287208 | | 11/1996 | |
| JP | 11-259615 | | 9/1998 | |
| JP | 11078325 A | * | 3/1999 | ........... B42D/15/10 |
| JP | 11-259615 | | 9/1999 | |

* cited by examiner

*Primary Examiner*—Anh Mai
(74) *Attorney, Agent, or Firm*—Lorusso, Loud & Kelly

(57) ABSTRACT

To present the ID tag including flat coil component, and characteristic adjusting method of ID tag capable of suppressing product fluctuations about the desired characteristic. The flat coil component of the ID tag of the invention comprises a flat coil composed of a conductive material provided continuously and spirally on an insulating substrate, and a jumper disposed on the flat coil with insulation, from one of inner end or outer end of this flat coil to the outside or inside of the flat coil where other end is positioned, in which the jumper is composed of a plurality of jumpers variable in the number of pieces in arrangement. The characteristic is adjusted by varying the number of effective pieces for forming the parallel arrangement.

12 Claims, 6 Drawing Sheets

| NUMBER OF EFFECTIVE PIECES | 1 | 2 | 3 | 4 | 5 | 6 | 7 |
|---|---|---|---|---|---|---|---|
| RESONANCE FREQUENCY [MHz] | 14.44 | 14.20 | 13.98 | 13.76 | 13.56 | 13.36 | 13.17 |

|  | THICKNESS OF INSULATING LAYER [μm] | RESONANCE FREQUENCY BEFORE ADJUSTMENT [MHz] | NO. Of JUMPERS REMOVED | RESONANCE FREQUENCY AFTER ADJUSTMENT [MHz] |
|---|---|---|---|---|
| FIRST SAMPLE | 22.0 | 13.177 | 2 | 13.559 |
| SECOND SAMPLE | 26.4 | 13.390 | 1 | 13.559 |
| THIRD SAMPLE | 26.6 | 13.404 | 1 | 13.568 |

FLAT COIL COMPONENT, CHARACTERISTIC ADJUSTING METHOD OF FLAT COIL COMPONENT, ID TAG, AND CHARACTERISTIC ADJUSTING METHOD OF ID TAG

BACKGROUND OF THE INVENTION

1. Field of the Invention

The present invention relates to a flat coil component, a characteristic adjusting method of the flat coil component, an ID tag, and an characteristic adjusting method of the ID tag.

2. Description of the Related Art

Recently, in various processings such as individual verification, merchandise management, and distribution process, ID tags (also known as IC cards) have come to be used. In particular, non-contact type ID tags are used widely.

Non-contact type ID tags are operated either by internal batteries, or by energy of radio wave or magnetic flux from a reading device of ID tags, and in the latter case, for example, necessary energy is obtained by utilizing the function of a flat coil component or an LC resonance circuit, using a flat coil component as an antenna element (Japanese Patent Laid-open No. 11-259615, Japanese Patent Publication No. 2814477).

FIG. 8 explains an example of antenna pattern in a conventional non-contact type ID tag 10.

In a plan in FIG. 8, the ID tag 10 has a flat coil 11, a jumper 12, an IC chip 13, and an IC connection wire 14 on an insulating substrate 15.

The flat coil 11 has a function of an antenna, and in FIG. 8 a conductive pattern made of conductive material such as aluminum foil, copper foil or silver paste is spirally wound and formed in a rectangular shape. In the case of FIG. 8, the end portion positioned at the inside of the spiral form of the flat coil 11 is directly connected to one terminal of the IC chip 13. The end portion positioned at the outside of the spiral form of the flat coil 11 is connected to one end of the jumper 12.

The jumper 12 is designed to transmit the electric characteristic (for example, potential) at the outside end portion of the flat coil 11 to the inside of the spiral form of the flat coil 11, and it is insulated from each loop of the flat coil 11. The jumper 12 is composed of a conductive layer 12A and an insulating layer 12B as described below (see FIG. 9).

The IC connection wire 14 is connected to the inside end portion of the jumper 12 and the other terminal of the IC chip 13.

In the IC chip 13, the unique code of the ID tag and other data are stored, and the stored data is transmitted by receiving a reading signal from a reading device not shown (also known as ID tag reader). The energy necessary for such transmitting and receiving process by the IC chip 13 is obtained mainly from the flat coil 11.

FIG. 9 is a magnified sectional view of intersection of a certain loop of the flat coil 11 and the jumper 12.

In FIG. 9, on the insulating substrate 15 made of plastic resin such as polyethylene terephthalate or polycarbonate, the flat coil 11 made of copper foil or the like is provided, and the jumper 12 is provided on the flat coil 11. The jumper 12 is, in the case of FIG. 9, composed of an insulating layer 12B made of an insulating resist resin responsible for the insulating function from the flat coil 11, and a conductive layer 12A of silver paste or the like responsible for the conductive function.

Thus, at the intersection of a certain loop of the flat coil 11 and the jumper 12, since the insulating layer 12B is enclosed by two conductive layers (flat coil 11 and conductive layer 12A), it functions as a capacitor.

The capacitance component CB by this capacitor is determined by the distance between two conductive layers (flat coil 11 and conductive layer 12A), in other words, the thickness D of the insulating layer 12B, the specific inductive capacity $\epsilon r$ of the insulting layer 12B, and the overlapping area S of the loop of the flat coil 11 and conductive layer 12A as shown in FIG. 10, and it can be expressed in formula (1), where $\epsilon 0$ is the dielectric constant of air.

$$CB = \epsilon 0 \cdot \epsilon r \cdot S / D \tag{1}$$

In the case of FIG. 8, since the number of intersections of the flat coil 11 and jumper 12 is seven, it is equivalent that there are seven capacitors, and the combined capacitance of the capacitor components of these seven capacitors is the capacitance C of the jumper 12.

Herein, supposing the capacitance of the IC chip 13 to be Cic, the resonance frequency F in FIG. 8 can be expressed in formula (2), where L is the inductor value due to the flat coil 11.

$$F = 1/2\pi \sqrt{\{L \cdot (Cic + C)\}} \tag{2}$$

That is, by making use of the LC resonance, the energy necessary for the transmitting and receiving process by the IC chip 13 is obtained. The resonance frequency F is the exchange frequency between the ID tag 10 and the reading device (not shown).

In the conventional non-contact type ID tag, however, fluctuations of resonance frequency are significant in individual products.

The jumper 12 occupies a very small area as seen from the entire substrate area, and therefore, generally, the insulating layer 12B is first formed by applying the insulating resist resin, and then the conductive layer 12A is formed by silk printing of silver paste or the like.

However, when the insulating layer 12B is formed by coating, the precision of the thickness (that is, D) is prone to decline (fluctuations are large).

When the precision of the distance D is lower (fluctuations are larger), the precision of the capacitance of the jumper 12 having its effect is forced to be lower (product fluctuations are increased), and the resonance frequency F is deviated from the desired frequency in many ID tags 10.

In the case of an ID tag 10 large in error of the resonance frequency from the desired resonance frequency F, the electric power receiving efficiency is lowered, and the communication distance with the reading device becomes shorter.

The invention is devised in the light of such problems, and it is an object thereof to present a flat coil component, characteristic adjusting method of flat coil component, ID tag, and characteristic adjusting method of ID tag, capable of suppressing product fluctuations of desired characteristics.

SUMMARY OF THE INVENTION

To solve the problems, the flat coil component of the first invention comprises a flat coil composed of a conductive material provided continuously and spirally on an insulating substrate, and a jumper disposed on the flat coil with insulation, from one of inner end or outer end of this flat coil to the outside or inside of the flat coil where other end is positioned, in which the jumper is composed of a plurality of jumpers variable in the number of pieces in arrangement.

The flat coil component relates to the flat coil component of the first invention, in which at least one of the plurality of jumpers is excluded from the number of jumpers in arrangement by changing from the conductive state to nonconductive state.

The flat coil component relates to the flat coil component of the first invention, in which at least one of the plurality of jumpers has electrical releasing portions missing the conductive material, and are incorporated into the number of pieces in arrangement by covering a conductive material to these electrical releasing portions.

The characteristic adjusting method of the flat coil component of the second invention comprises the flat coil composed of the conductive material provided continuously and spirally on an insulating substrate, and the jumper disposed on the flat coil with insulation, from one of inner end or outer end of this flat coil to the outside or inside of the flat coil where other end is positioned, in which the jumper is composed of a plurality of jumpers variable in the number of pieces in arrangement, and the characteristic is adjusted by varying the effective number of pieces in arrangement out of the plurality of jumpers.

The characteristic adjusting method of the flat coil component relates to the characteristic adjusting method of the flat coil component of the second invention, in which at least one of the plurality of jumpers is excluded from the number of jumpers in arrangement by changing from the conductive state to nonconductive state, and thereby the characteristic of the flat coil component is adjusted.

The characteristic adjusting method of the flat coil component relates to the characteristic adjusting method of the flat coil component of the second invention, in which at least one of the plurality of jumpers has electrical releasing portions missing the conductive material, and are incorporated into the number of pieces in arrangement by covering a conductive material to these electrical releasing portions, and thereby the characteristic of the flat coil component is adjusted.

The ID tag of the third invention is an ID tag of non-contact type including a flat coil component as an antenna element, in which the flat coil component comprises a flat coil composed of a conductive material provided continuously and spirally on an insulating substrate, and a jumper disposed on the flat coil with insulation, from one of inner end or outer end of this flat coil to the outside or inside of the flat coil where other end is positioned, and further the jumper is composed of a plurality of jumpers variable in the number of pieces in arrangement.

The ID tag relates to the ID tag of the third invention, in which at least one of the plurality of jumpers is excluded from the number of jumpers in arrangement by changing from the conductive state to nonconductive state.

The ID tag relates to the ID tag of the third invention, in which at least one of the plurality of jumpers has electrical releasing portions missing the conductive material, and are incorporated into the number of pieces in arrangement by covering the conductive material to these electrical releasing portions.

The characteristic adjusting method of ID tag of the fourth invention is a characteristic adjusting method of ID tag of non-contact type including a flat coil component as an antenna element, in which the flat coil component comprises a flat coil composed of a conductive material provided continuously and spirally on an insulating substrate, and a jumper disposed on the flat coil with insulation, from one of inner end or outer end of this flat coil to the outside or inside of the flat coil where other end is positioned, and further the jumper is composed of a plurality of jumpers variable in the number of pieces in arrangement, and the characteristic of the ID tag is adjusted by varying the effective number of pieces in arrangement out of the plurality of jumpers.

The characteristic adjusting method of ID tag relates to the characteristic adjusting method of ID tag of the fourth invention, in which at least one of the plurality of jumpers is excluded from the number of jumpers in arrangement by changing from the conductive state to nonconductive state, and thereby the characteristic of the ID tag is adjusted.

The characteristic adjusting method of ID tag relates to the characteristic adjusting method of ID tag of the fourth invention, in which at least one of the plurality of jumpers has electrical releasing portions missing the conductive material, and are incorporated into the number of pieces in arrangement by covering the conductive material to these electrical releasing portions, and thereby the characteristic of the ID tag is adjusted.

Figure 1:
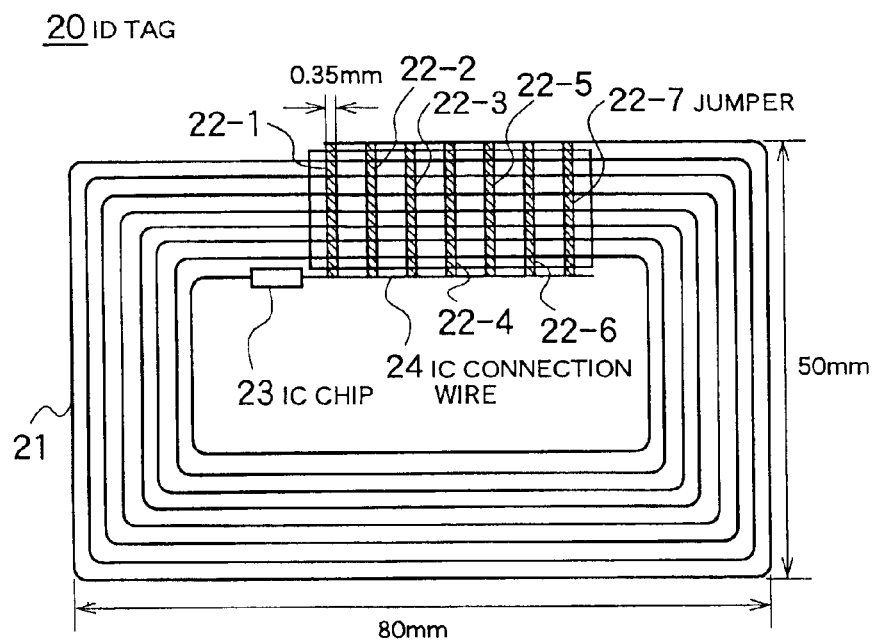
FIG. 1 is a plan showing circuit elements and the like the of ID tag in a first embodiment.

DESCRIPTION OF THE PREFERRED EMBODIMENTS (A) A First Embodiment

Referring now to the drawings, a first embodiment of a flat coil component, a characteristic adjusting method of flat coil component, ID tag, and characteristic adjusting method of ID tag according to the invention will be explained below.

(A-1) Configuration of the First Embodiment

FIG. 1 is an explanatory diagram of non-contact type ID tag using a flat coil component of the first embodiment, showing a schematic plan of a state in which the surface side of the ID tag is not covered, that is, the internal electric wiring pattern is formed and exposed directly.

In FIG. 1, an ID tag 20 of the first embodiment also comprises a flat coil 21, jumpers 22-1 to 22-7, an IC chip 23, and an IC connection wire 24.

The flat coil 21, IC chip 23, and IC connection wire 24 function same as in the prior art.

In the case of the first embodiment, a plurality of (seven pieces in FIG. 1) jumpers 22-1 to 22-7 are provided, and these jumpers 22-1 to 22-7 are arranged parallel between the outermost loop of the flat coil 21 and the IC connection wire 24.

In the jumpers 22-1, . . . , 22-7, the wire width of the conductive layer (see reference numeral 22A in FIG. 2) is same in each wire, and is formed narrower than the wire width of the conductive layer formed of one jumper as in the prior art. For example, supposing the wire width of conductive layer 22A in the jumpers 22-1, . . . , 22-7 to be t, and the wire width of the conductive layer formed of one jumper as in the prior art intended to be of same resonance frequency to be T, it is designed to meet the relation of 7t>T.

The combined capacitance value in the parallel circuit about capacitance components is, as known well, the sum of capacitance values of each capacitance component. Therefore, when the wire width of the conductive layer 22A in the jumpers 22-1, . . . , 22-7 is equal, and when the capacitance values are assumed to be equal in the jumpers 22-1, . . . , 22-7, the combined capacitance value can be varied depending on the number of effective parallel pieces.

The jumpers 22-1, . . . , 22-7 are designed so as to be removed from the number of effective parallel pieces easily.

Figure 2:
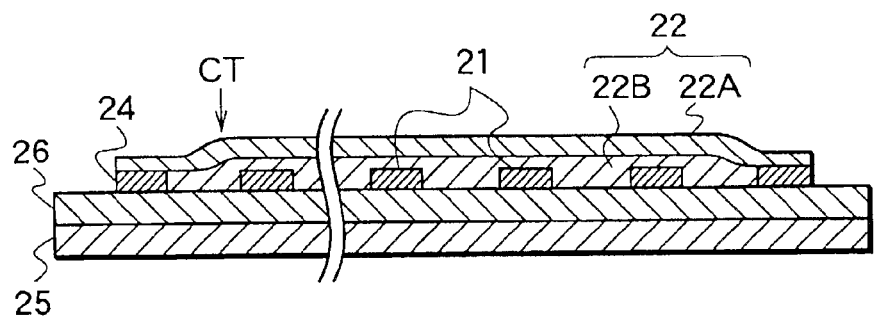
FIG. 2 is a sectional view along the longitudinal direction of jumper in the first embodiment.

FIG. 2 is a sectional view along the longitudinal direction of a certain jumper 22 (any one of 22-1 to 22-7).

In FIG. 2, the flat coil 21 and IC connection wire 24 are disposed on the insulating substrate 25 which is a basic substrate of the ID tag 20 by way of a resin layer 26. The resin layer 26 is an adhesive layer or the like used for providing the flat coil 21 on the insulating substrate 25. The flat coil 21 may be also disposed directly on the insulating substrate 25 without using resin layer 26.

On the conductive pattern of each loop excluding the outermost loop of the flat coil 21, the insulating layer (or a dielectric layer from the viewpoint of a capacitor) 22B of the jumper 22 is disposed, on which a conductive layer 22A of this jumper 22 is mounted. This conductive layer 22A is connected to the outermost loop of the flat coil 11 and the IC connection wire 24.

For example, when the conductive layer 22A of the jumper 22 (22-1, . . . , 22-7) is composed of silver paste, by removing a part or plural parts of the silver paste (for example, the silver paste at the position of CT in FIG. 2) by using a needle-like tool, that is, by disconnecting the jumper, the specific jumper 22 can be removed from the parallel circuit.

Or, in the case of the jumper 22 (22-1, . . . , 22-7) is composed like a conductive adhesive tape by using an adhesive layer as the insulating layer 22B and a metal tape as the conductive layer 22A, by peeling off the entire jumper, it can be removed from the parallel circuit.

(A-2) Characteristic Adjusting Method of the First Embodiment

Figures 3, 4:
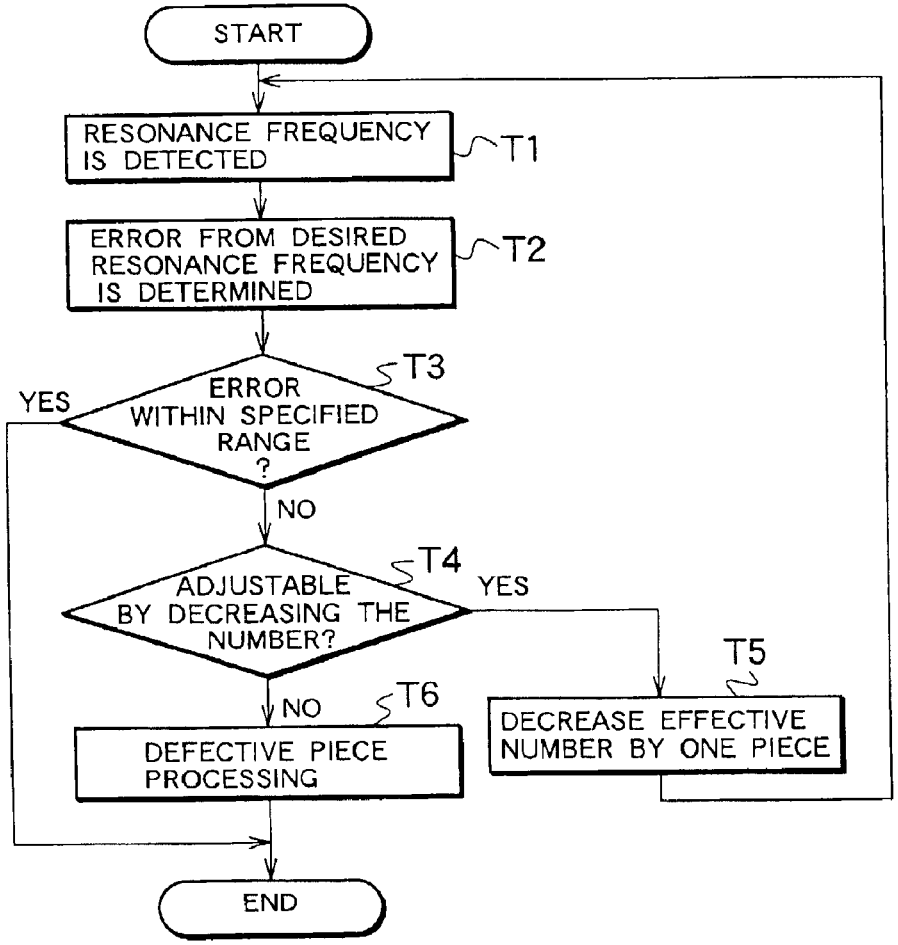
FIG. 3 is an explanatory diagram showing the characteristic adjusting procedure of ID tag in the first embodiment.
FIG. 4 is an explanatory diagram showing the relation between the number of effective jumpers and the design resonance frequency in the first embodiment.

The characteristic adjusting method of the ID tag 20 (also used for the characteristic adjusting method of the flat coil component) in the first embodiment composed of such circuit elements is explained by referring to FIG. 3 which shows the processing procedure.

The characteristic adjustment shown in FIG. 3 may be done automatically, or part or whole of the procedure may be carried out by the adjusting operator.

First, the resonance frequency is detected in the ID tag 20 in the processed state except for surface coating step as shown in FIG. 1 (T1).

Then, the error between the desired resonance frequency of the ID tag 20 and the detected resonance frequency is checked (T2), and it is determined if the error is within a specified range or not (T3).

When the error is within the specified range, the series of processing shown in FIG. 3 is terminated. At this time, the process proceeds to the surface coating, so that the ID tag is completed.

By contrast, if the detected error of resonance frequency exceeds the specified range, it is determined if adjustable by decreasing the number of jumpers or not (T4). For example, if the error is too large, it is determined as not adjustable. Or in the case if there is only one jumper with no breakage or peeling left, it is determined as not adjustable since no effective jumper is present by removing the jumper.

If adjustable by decreasing the number of jumpers, one of them is removed from the parallel circuit (for example, by breaking process or peeling process) (T5), and the process returns to step T1.

On the other hand, if impossible to adjust by decreasing the number of jumpers, the process for defective piece is performed by noticing a defective piece or the like (T6), and the series of process shown in FIG. 3 is terminated.

(A-3) Effects of the First Embodiment

As described above, according to the first embodiment, a plurality of jumpers are provided so as to allow to vary the number of pieces for composing the parallel circuit, and the number of pieces is varied appropriately, and therefore the error between the resonance frequency of the ID tag and the desired resonance frequency can be suppressed, so that the communication distance from the reading device may be extended.

The experiment conducted herein will be explained below. The ID tag 20 of the first embodiment having the configuration as shown in FIG. 1 and FIG. 2 was composed of the following materials.

Insulating substrate 25: A polyethylene terephthalate film of 50 μm in thickness.

Flat coil 21 and IC connection wire 24: A copper foil of 35 μm in thickness having an adhesive layer of 20 μm in thickness on one side was adhered to the insulating substrate 25, and the wire width was adjusted to 0.8 mm by etching.

IC chip 23: IC chip for RFID (trade name as I-CODE of Philips Inc.).

Insulating layer 22B of jumper: An acrylic resin insulating resist layer (target film thickness 25 μm) (trade name as ML25089 of Acheson Japan Limited.).

Conductive layer 22A of jumper: A silver paste layer of film thickness of 15 μm and wire width of 0.35 mm (trade name as DW250L-1 of Toyobo Co.).

In such design condition, a relation shown in FIG. 4 is established between the number of effective pieces of jumpers 22-1 to 22-7 and the resonance frequency. That is, when the number of effective pieces is five, the resonance frequency becomes as desired.

Figures 5, 6:
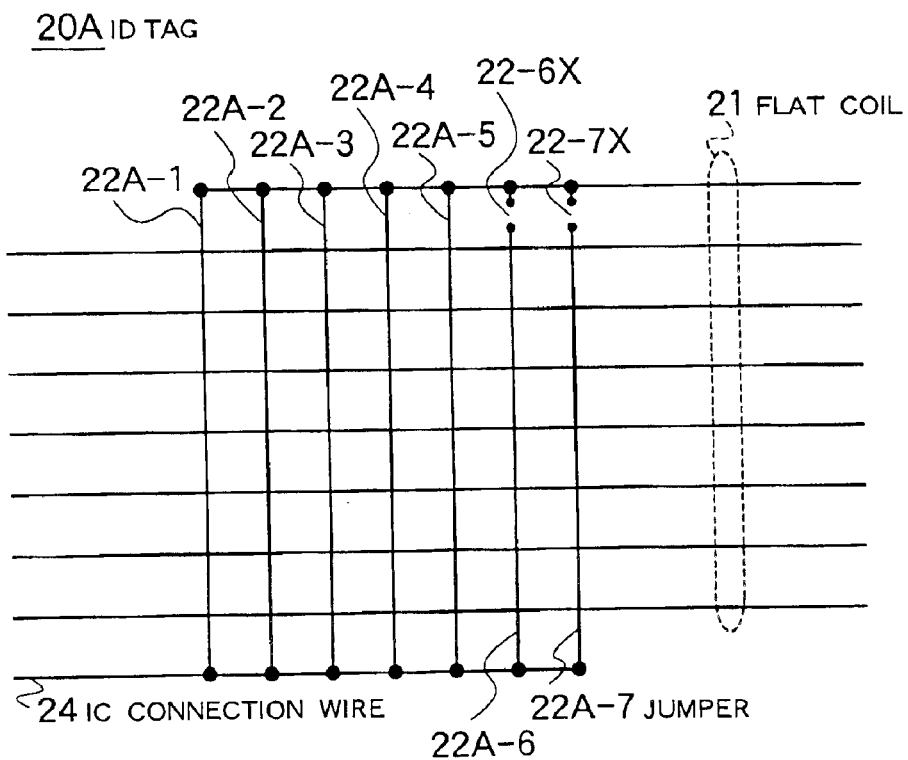
FIG. 5 is an explanatory diagram of effects of ID tag in the first embodiment.
FIG. 6 is a schematic plan showing an essential configuration of ID tag in a second embodiment.

However, the thickness of insulating layer of jumper varies in manufacture. In the said design condition (target thickness of 25 μm of insulating layer, etc.), three samples were manufactured. Thickness of the insulating layer was 22.0 μm in the first sample, 26.4 μm in the second sample, and 26.6 μm in the third sample. FIG. 5 shows the resonance frequency before and after the characteristic adjustment process of these samples.

In the first sample, when two out of seven jumpers were removed, the resonance frequency was 13.559 MHz, and the error from the desired resonance frequency of 13.56 MHz was −0.001 MHz. In the second sample, when one out of seven jumpers was removed, the resonance frequency was 13.559 MHz, and the error from the desired resonance frequency of 13.56 MHz was −0.001 MHz. In the third sample, when one out of seven jumpers was removed, the resonance frequency was 13.568 MHz, and the error from the desired resonance frequency of 13.56 MHz was 0.008 MHz.

At the present, the error range is −0.098 to 0.057 MHz, and the error range in the first embodiment was −0.001 to 0.008 MHz, and it is known that the desired resonance frequency is almost achieved in the first embodiment.

(B) A Second Embodiment

Referring now to the drawings, a second embodiment of flat coil component, characteristic adjusting method of flat coil component, ID tag, and characteristic adjusting method of ID tag according to the invention will be explained below.

(B-1) Configuration of the Second Embodiment

FIG. 6 is a schematic plan (image diagram) of essential parts of the second embodiment, and same parts corresponding to the first embodiment are identified with same reference numerals.

In the ID tag 20A of the second embodiment, the flat coil 21, IC chip 23, and IC connection wire 24 are same as the ones in the first embodiment.

The ID tag 20A of the second embodiment has jumpers 22A-1 to 22A-7 as shown in FIG. 6 before the characteristic adjustment process. The first to fifth jumpers 22A-1 to 22A-5 are same as the ones in the first embodiment.

The sixth and seventh jumpers 22A-6 and 22A-7 have notches 22-6X and 22-7X formed in part of the conductive layer (see 22A in FIG. 2). These notches 22-6X and 22-7X are covered with conductive material (for example, silver paste or solder), so that the entire jumpers 22A-6, 22A-7 are set in a conductive state, and such conductive state is incorporated into the parallel circuit composed of plural jumpers.

Herein, the number of jumpers 22A-1 to 22A-5 not having the notches is five, which is because the desired resonance frequency is achieved by five pieces in design.

(B-2) Characteristic Adjusting Method of the Second Embodiment

The characteristic adjusting method of the ID tag 20A (also used for the characteristic adjusting method of the flat coil component) in the second embodiment composed of such circuit elements will be explained by referring to FIG. 7 which shows the processing procedure.

Figure 7:
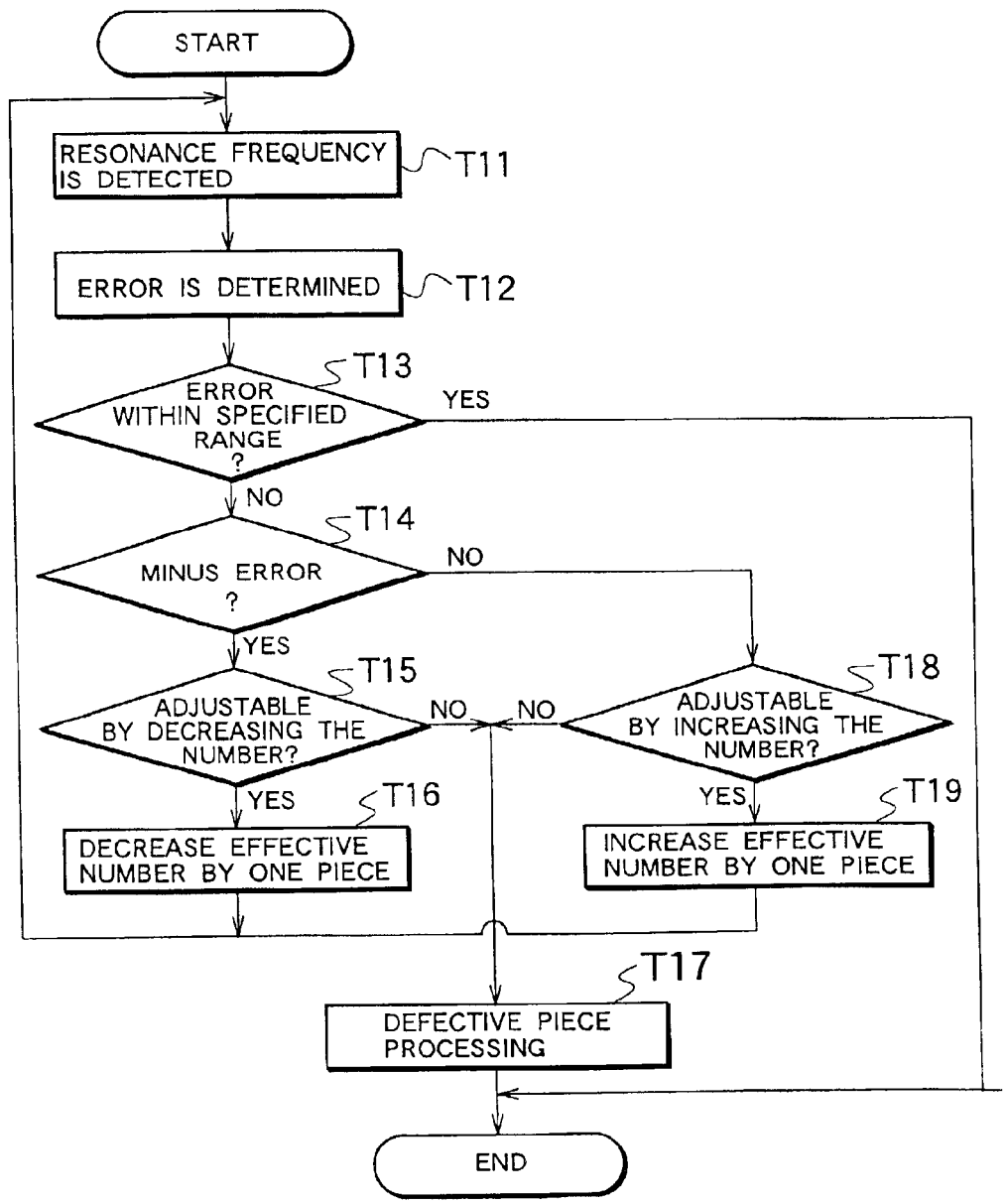
FIG. 7 is an explanatory diagram showing the characteristic adjusting procedure of ID tag in the second embodiment.
Figure 8:
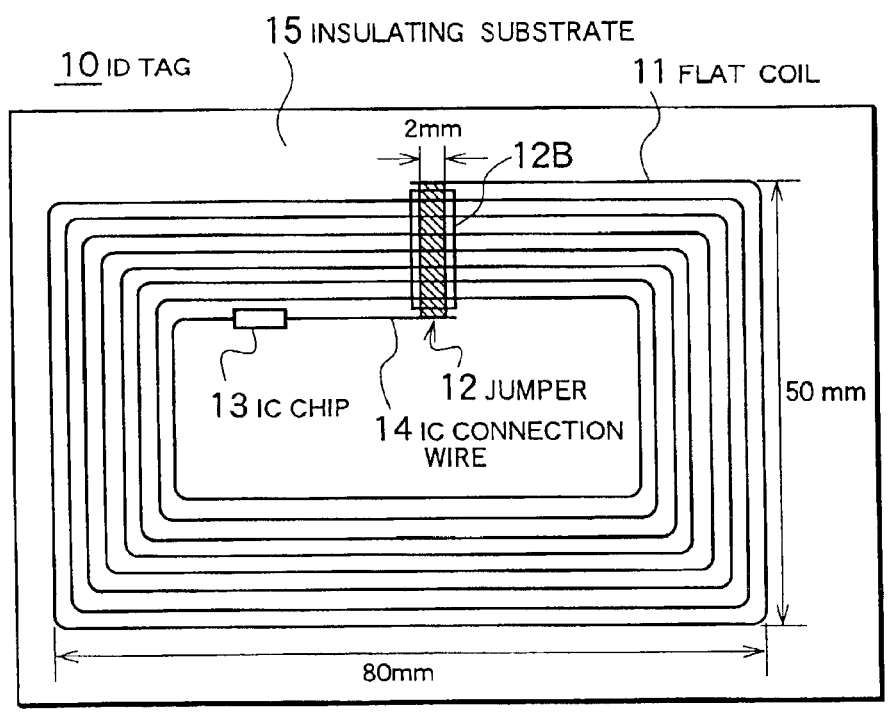
FIG. 8 is a plan showing circuit elements and others of a conventional ID tag.
Figure 9:
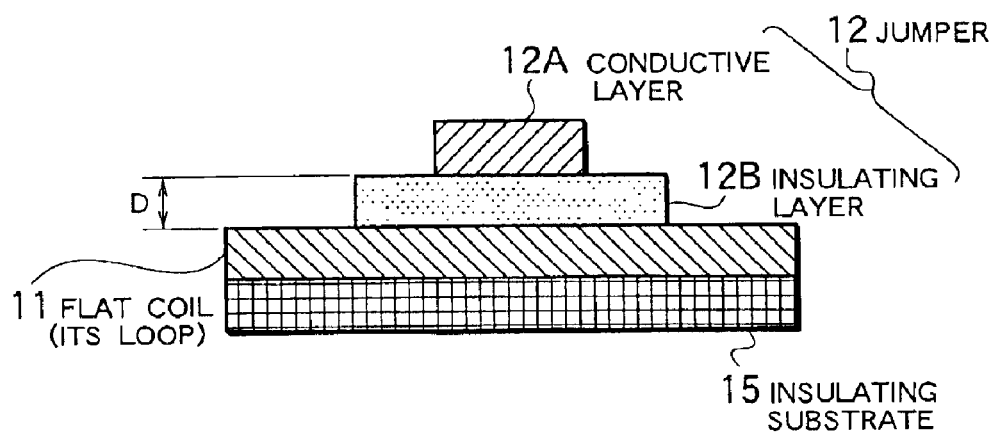
FIG. 9 is a sectional view of intersection of jumper of conventional ID tag and flat coil.
Figure 10:
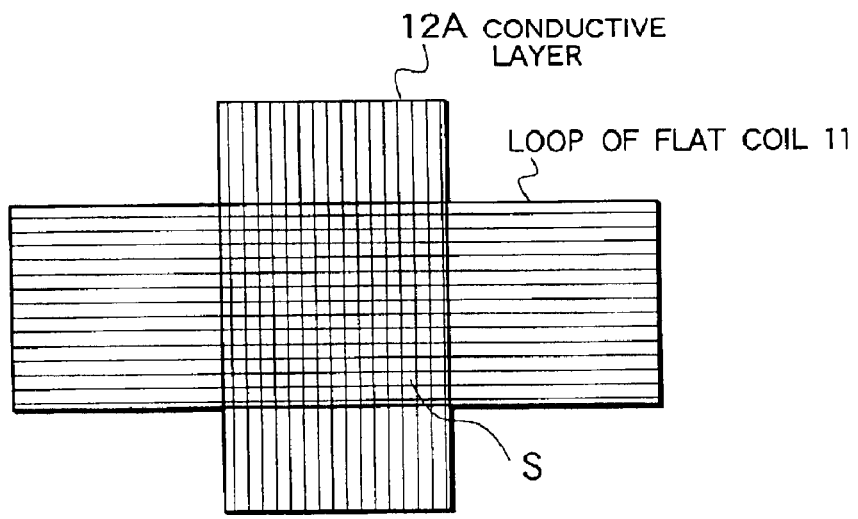
FIG. 10 is an explanatory diagram of essential parts for determining the capacitance value at the intersection in FIG. 9.

The characteristic adjustment shown in FIG. 7 may be carried out automatically, or part or whole of the procedure may be carried out by the adjusting operator.

First, the resonance frequency is detected in the ID tag 20A in the state shown in FIG. 6 (T11).

Then, the error between the desired resonance frequency of the ID tag 20A and the detected resonance frequency is checked (T12), and it is determined if the error is within a specified range or not (T13).

When the error is within the specified range, the series of processing shown in FIG. 7 is terminated. At this time, the process proceeds to the surface coating, so that the ID tag 20A is completed.

By contrast, if the detected error of resonance frequency exceeds the specified range, it is determined if the error is plus or minus (T14).

In the case of a minus error, it is determined if adjustable by decreasing the number of effective jumpers or not (T15), and if adjustable by decreasing the number of effective jumpers, one of them is removed from the parallel circuit (for example, by breaking process or peeling process) (T16), and the process returns to step T11. On the other hand, if impossible to adjust by decreasing the number of jumpers, the process for defective piece is performed by noticing a defective piece or the like (T17), and the series of process shown in FIG. 7 is terminated.

In the case of a plus error, it is determined if adjustable by increasing the number of effective jumpers or not (T18), and if adjustable by increasing the number of effective jumpers, one jumper is added to the parallel circuit (for example, by covering the notches with the conductive material) (T19), and the process returns to step T11. On the other hand, if impossible to adjust by increasing the number of jumpers, the process for defective piece is performed by noticing a defective piece or the like (T17), and the series of process shown in FIG. 7 is terminated.

(B-3) Effects of the Second Embodiment

As described above, according to the second embodiment, a plurality of jumpers are provided so as to allow to vary the number of pieces for composing the parallel circuit, and the number of pieces is varied appropriately, and therefore the error between the resonance frequency of the ID tag and the desired resonance frequency can be suppressed, so that the communication distance from the reading device may be extended.

(C) Other Embodiments

The materials of the flat coil, jumper and insulating substrate, and their pattern forming methods are not particularly specified, but may be selected arbitrarily.

In the foregoing embodiments, the IC chip 23 is positioned inside of the flat coil 21, but the invention may be also applied in a case in which the IC chip 23 is positioned outside of the flat coil 21 and the jumper conducts the inside end portion of the flat coil 21 to the outside of the flat coil.

In the embodiments, when adjusting the characteristic, the jumper is increased or decreased one by one, but considering the magnitude of error, two or more jumpers may be increased or decreased in one operation for adjusting the number of pieces.

Further in the embodiments, in all of ID tags 20, 20A, the resonance frequency is detected, and the number of parallel jumpers is adjusted (to adjust the characteristic), but it may be processed in the following product lot unit. That is, from the product lot (for example, 100 pieces) of ID tags 20, 20A manufactured at the same time and by the same machine that are assumed to have nearly uniform characteristics, a specified number (for example, three pieces) of ID tags 20, 20A are sampled, and from the sample number of ID tags 20, 20A, the number of pieces of increasing or decreasing the jumpers is determined, and the specified number of jumpers may be increased or decreased in all ID tags 20, 20A of the product lot.

In the embodiments, the flat coil component of the invention is applied to the ID tag, but the flat coil component of the invention can be applied widely in all flat electronic circuits containing flat coil components as elements, and the characteristic may be adjusted appropriately.

As described above, the invention realizes the flat coil component, characteristic adjusting method of flat coil component, ID tag, and characteristic adjusting method of ID tag, capable of suppressing product fluctuations about the desired characteristic.

What is claimed is:

1. A flat coil component comprising a flat coil composed of a conductive material provided continuously and spirally on an insulating substrate, and a jumper disposed on the flat coil with insulation, from one of inner end or outer end of this flat coil to the outside or inside of the flat coil where other end is positioned, wherein the jumper is composed of a plurality of jumpers variable in the number of pieces in arrangement.

2. The flat coil component of claim 1, wherein at least one of the plurality of jumpers is excluded from the number of jumpers in arrangement by changing from the conductive state to nonconductive state.

3. The flat coil component of claim 1, wherein at least one of the plurality of jumpers has electrical releasing portions missing the conductive material, and are incorporated into the number of pieces in arrangement by covering a conductive material to these electrical releasing portions.

4. A characteristic adjusting method of a flat coil component comprising a flat coil composed of a conductive material provided continuously and spirally on an insulating substrate, and a jumper disposed on the flat coil with insulation, from one of inner end or outer end of the flat coil to the outside or inside of the flat coil where other end is positioned, wherein the jumper is composed of a plurality of jumpers variable in the number of pieces in arrangement, and the characteristic is adjusted by varying the effective number of pieces in arrangement out of the plurality of jumpers.

5. The characteristic adjusting method of flat coil component of claim 4, wherein at least one of the plurality of jumpers is excluded from the number of jumpers in arrangement by changing from the conductive state to nonconductive state, and thereby the characteristic of the flat coil component is adjusted.

6. The characteristic adjusting method of flat coil component of claim 4, wherein at least one of the plurality of jumpers has electrical releasing portions missing the conductive material, and are incorporated into the number of pieces in arrangement by covering a conductive material to these electrical releasing portions, and thereby the characteristic of the flat coil component is adjusted.

7. An ID tag of non-contact type including a flat coil component as an antenna element, wherein the flat coil component comprises a flat coil composed of a conductive material provided continuously and spirally on an insulating substrate, and a jumper disposed on the flat coil with insulation, from one of inner end or outer end of the flat coil to the outside or inside of the flat coil where other end is positioned, and further the jumper is composed of a plurality of jumpers variable in the number of pieces in arrangement.

8. The ID tag of claim 7, wherein at least one of the plurality of jumpers is excluded from the number of jumpers in arrangement by changing from the conductive state to nonconductive state.

9. The ID tag of claim 7, wherein at least one of the plurality of jumpers has electrical releasing portions missing the conductive material, and are incorporated into the number of pieces in arrangement by covering the conductive material to these electrical releasing portions.

10. A characteristic adjusting method of an ID tag of non-contact type including a flat coil component as an antenna element, wherein the flat coil component comprises a flat coil composed of a conductive material provided continuously and spirally on an insulating substrate, and a jumper disposed on the flat coil with insulation, from one of inner end or outer end of this flat coil to the outside or inside of the flat coil where other end is positioned, and further the jumper is composed of a plurality of jumpers variable in the number of pieces in arrangement, and the characteristic of the ID tag is adjusted by varying the effective number of pieces in arrangement out of the plurality of jumpers.

11. The characteristic adjusting method of the ID tag of claim 10, wherein at least one of the plurality of jumpers is excluded from the number of jumpers in arrangement by changing from the conductive state to nonconductive state, and thereby the characteristic of the ID tag is adjusted.

12. The characteristic adjusting method of ID tag of claim 10, wherein at least one of the plurality of jumpers has electrical releasing portions missing the conductive material, and are incorporated into the number of pieces in arrangement by covering the conductive material to these electrical releasing portions, and thereby the characteristic of the ID tag is adjusted.

* * * * *